United States Patent [19]
Heyden et al.

[11] 3,957,712
[45] May 18, 1976

[54] USE OF A HYDROPHILIC PLASTICIZER FOR PLASTIC DISPERSIONS AND PASTES

[75] Inventors: Rudi Heyden, Hochdahl-Millrath; Michael Eckelt, Dusseldorf; Karl Mahall, Monheim, Baumberg; Wilfried Kuper, Dusseldorf, all of Germany

[73] Assignee: Henkel & Cie G.m.b.H., Dusselforf, Germany

[22] Filed: Aug. 20, 1974

[21] Appl. No.: 498,998

[30] Foreign Application Priority Data
Aug. 27, 1973 Germany .................... 2343198

[52] U.S. Cl. .................. 260/31.4 R; 260/29.6 ME; 260/29.7 E; 260/34.2
[51] Int. Cl.² .......................................... C08K 5/11
[58] Field of Search ............ 260/31.4 R, 410.6, 34.2

[56] References Cited
UNITED STATES PATENTS

| | | | |
|---|---|---|---|
| 2,373,347 | 4/1945 | Schoenfeld | 260/34.2 |
| 2,379,236 | 6/1945 | Jenkins | 260/34.2 |
| 2,385,920 | 10/1945 | Jenkins | 260/34.2 |
| 2,457,139 | 12/1948 | Fife | 260/410.6 |
| 2,469,446 | 5/1949 | Strauss | 260/410.6 |
| 2,940,949 | 6/1960 | Mullin | 260/31.4 R |

*Primary Examiner*—Paul R. Michl
*Attorney, Agent, or Firm*—Hammond & Littell

[57] ABSTRACT

In the process of plasticizing hardenable plastics in the form of dispersions and pastes, the use of fatty acid esters of polyoxyalkylene glycol having the formula $$R_1-A-R_2$$

wherein $R_1$ and $R_2$ are acyls of the fatty acids having from 12 to 22 carbon atoms and A is a bivalent polyoxyalkylene glycol radical having a molecular weight of from 2000 to 4000 and a content of 40 to 50% by weight of ethylene oxide units and 50 to 60% by weight of propylene oxide units, as hydrophilic plasticizers for said plastic dispersions and pastes.

10 Claims, No Drawings

USE OF A HYDROPHILIC PLASTICIZER FOR PLASTIC DISPERSIONS AND PASTES

THE PRIOR ART

Plastic dispersions or pastes produced from polymers or copolymers of vinyl acetate, vinyl chloride, acrylic acid or methacrylic acid esters with alcohols, butadiene, styrene, maleic acid esters with alcohols, and the like are used for various technical purposes, e.g. as paints, adhesives, coverings, binders, etc. In order to improve the plasticity and smoothness of the final products, plastic softening agents or plasticizers must be added. These are usually water-insoluble, difficulty volatile compounds, such as tricresyl phosphate, phthalic acid or adipic acid esters of long-chained alcohols, such as dioctyl phthalate, and the like.

Because of their water-insoluble and hydrophobic character, the incorporation of these plasticizers in aqueous plastic dispersions presents certain difficulties. Careful homogenization is necessary, otherwise the plasticizer or the polymer will separate. The plasticizing effect is not always satisfactory and requires a relatively large amount of plasticizer. PVC films or coatings produced with such plasticizers have a very low water vapor adsorption and water vapor permeability and are therefore not suitable for many uses, such as packaging materials for the food industry, for water vapor permeable paints or as leather substitutes for boot legs and shoe uppers.

OBJECTS OF THE INVENTION

An object of the present invention is the development of a use of hydrophilic plasticizers for plastic dispersions and pastes which can be easily incorporated and which, in addition to excellent plasticizing and antistatic effects, impart the capacity of greater water vapor absorption.

Another object of the present invention is the development of an improvement in the process of compounding a plastic dispersion or paste which comprises mixing an ester-type plasticizer which is compatible with an aqueous dispersion of a plastic, with a thermoplastic polymer in the form selected from the group consisting of aqueous dispersions and non-aqueous dispersions and recovering a plastic material, the improvement consisting of using a hydrophilic fatty acid ester of a polyoxyalkylene glycol having the formula

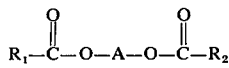

wherein

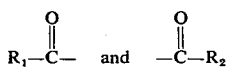

are the the acyls of fatty acids having from 12 to 22 carbon atoms and A is a bivalent polyoxyalkylene having a molecular weight of from 2000 to 4000 and a content of 40 to 50% by weight of ethylene oxide units and 50 to 60% by weight of propylene oxide units, as said ester-type plasticizer.

These and other objects of the invention will become more apparent as the description thereof proceeds.

DESCRIPTION OF THE INVENTION

The above objects have been achieved and the drawbacks of the prior art have been overcome, according to the present invention, by the use, in place of the known plasticizers for plastics, of hydrophilic fatty acid esters of polyoxyalkylene glycol the general formula

where $R_1$ and $R_2$ denote identical or different fatty acid radicals of the chain lengths of $C_{12}$ to $C_{22}$, and A is a polyoxyalkylene glycol radical with a molecular weight of 2000 to 4000, containing 40 to 50% by weight of ethylene oxide units and 50 to 60% by weight of propylene oxide units.

The use of these products as plasticizers for plastics results in a number of advantages compared to the conventional plasticizers. Due to their hydrophility and water-solubility, the aforesaid fatty acid esters of polyoxyalkylene glycol can be prepared as concentrated aqueous pastes whose incorporation into aqueous plastic dispersions presents no difficulties. The plasticizers are also compatible with non-aqueous PVC pastes and give in all cases an excellent plasticizing effect which considerably exceed in many cases that of the conventional plasticizers. In addition, excellent antistatic effects are achieved on the basis of the hydrophility of the plasticizers. The water vapor absorption, for example, of PVC coatings or coverings prepared from the so-plasticized PVC is considerably increased and can attain that of leather.

More particularly, therefore, the present invention involves, in the process of compoundng a plastic dispersion or paste which comprises mixing an ester-type plasticizer which is compatible with an aqueous dispersion of a plastic, with a thermoplastic polymer in the form selected from the group consisting of aqueous dispersions and non-aqueous dispersions and recovering a plastic material, the improvement consisting of using a hydrophilic fatty acid ester of a polyoxyalkylene glycol having the formula

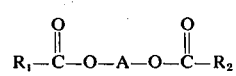

wherein

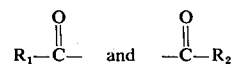

are the acyls of fatty acids having from 12 to 22 carbon atoms and A is a bivalent polyoxyalkylene having a molecular weight of from 2000 to 4000 and a content of 40 to 50% by weight of ethylene oxide units and 50 to 60% by weight of propylene oxide units, as said ester-type plasticizer.

The hydrophilic fatty acid esters of polyoxyalkylene glycol, used as plasticizers are produced from polyoxyalkylene glycols with a molecular weight of 2000 to 4000, containing 40 to 50% by weight of ethylene oxide units and 50 to 60% by weight of propylene oxide units, which are esterified in known manner with fatty acid or fatty acid mixtures of the chain lengths of $C_{12}$ to $C_{22}$. The fatty acids can be branch-chained or unsaturated, but preferably straight-chained, saturated fatty acids, such as palmitic acid, stearic acid, or behenic acid, are used. The polyoxyalkylene glycols can be obtained by copolymerization of 40 to 50% by weight of ethylene oxide and 50 to 60% by weight of propylene oxide, or preferably by polymerization of ethylene oxide onto polyoxypropylene glycols in the abovementioned quantitative ratios.

The claimed plasticizers are suitable as additives to aqueous dispersions of various polymers and copolymers conventionally prepared as aqueous dispersions, such as polyvinyl acetate, polyvinyl chloride, poly-lower alkyl acrylates or methacrylates, polybutadiene, polystyrene or polymaleic acid esters (poly-dialkyl maleates) and their copolymers and mixtures, as well as to anhydrous polyvinyl chloride pastes. About 2 to 15% by weight, preferably 2 to 10% by weight, based on the aqueous dispersion or paste, are required. When employing PVC pastes, it is preferable to employ from 5 to 10% by weight of the plasticizers of the present invention. The incorporation is normally effected by simple stirring by means of a stirring apparatus, kneader or other homogenizing apparatus, starting preferably from commercial plastizcizer-free plastic dispersions with a content of 40 to 60% by weight of polymer. As a rule, the claimed fatty acid esters of polyoxyalkylene glycols are used as the only plasticizer. But it may be expedient to use the plasticizers according to the invention in combination with conventional plasticizers such as tricresyl-phosphate, phthalic or adipic esters. This is of particular importance with non-aqueous dispersions or pastes where the dispersing liquid is customarily a conventional ester-type plasticizer.

The plasticizer-containing plastic dispersions are used in known manner for coverings, films, adhesives, binders, linings, coatings and for strengthening non-woven fabrics. They are particularly suitable where great softness or smoothness are desired, such as in textile materials. Due to the high water vapor adsorption and water vapor permeability, the plasticizers can be used with great advantage in the production of leather substitutes, for example, for boot legs or shoe uppers, or for water-vapor-permeable food packaging materials or, for example, in the form of coated fabrics, non-woven fabrics or paper, or for more moisture-permeable paints for wood, etc.

Though the claimed fatty acid esters of polyoxyalkylene glycol are hydrophilic and partly soluble in water, the wash-fastness, for example, of coated or flocked fabrics, bonded non-woven fabrics, etc., is surprisingly good, so that these products retain their softness and their good feel or handle despite repeated washings.

Another very desirable effect of the plasticizers according to the invention is their good antistatic effect, so that the electric conductivity of PVC linings, for example, is increased to such an extent that electrostatic charges are practically completely avoided in normal use.

The following examples are illustrative of the practice of the invention without being limitative in any manner.

EXAMPLE 1

An aqueous, plasticizer-free, anionic 45% dispersion of a thermally cross-linkable polyacrylic acid ester produced, when employed as a flock pressure adhesive on a cotton fabric, hardened flocked fabrics, which are not useful in this form.

By application of a mixture of:

80 parts by weight of the 45% plastic dispersion and
20 parts by weight of a 40% paste consisting of the distearic acid ester of a polyoxyalkylene glycol (molecular weight about 3500, 57.5% by weight of propylene oxide and 42.5% by weight of ethylene oxide) as plasticizer, a fabric with excellent soft feel was produced. The coated fabrics retained a pleasant soft feel even after 5 wash cycles at 95°C, washing duration 30 minutes, with 3 gm of a commercial washing agent per liter of wash liquor.

EXAMPLE 2

For strengthening non-woven fabrics of staple rayon fibers, copolymer dispersions based on butadiene/styrene are frequently used, to which a plasticizer must be added so that the non-woven fabrics are soft and smooth.

5% by weight of a distearic acid ester of a polyoxyalkylene glycol (molecular weight 3500, 57.5% by weight of propylene oxide and 42.5% by weight of ethylene oxide) in the form of a 50% aqueous paste were added to a 50% aqueous dispersion of a butadiene-styrene copolymer. The dispersion was diluted to a content of 300 gm/l of copolymer and applied with a foulard onto a non-woven staple rayon fabric. After squeezing, the staple rayon fabric exhibited a weight increase of 150 percent. Subsequently, the fabric was dried for 3 minutes at 120°C or 140°C respectively. In both cases, we obtained non-woven fabrics which were extremely soft. In a comparison test, increasing amounts of dibutyl phthalate instead of the polyoxyalkylene glycol ester were added to the dispersion as a plasticizer. Only with an addition of 20% by weight of dibutyl phthalate was a staple rayon fabric of similar softness obtained.

EXAMPLE 3

Polyurethane-coated cotton fabrics were used for the production of imitation leather for boot legs. In order to increase the adsorption, the cloth side of these coated fabrics, hence the inside of the limitation leather, was lined additionally with nettle cloth.

Mixtures of commercial 50% plastic dispersions were employed as wet lining agents. These plastic dispersions were based on A. vinyl acetate/ethylene copolymerizate
B. vinyl acetate/mono-2-ethylhexyl-maleate copolymerizate
C. vinyl acetate/acrylic ester copolymerizate Various plasticizers were added to these plastic dispersions in the amounts as indicated in Table I below.

TABLE I

|  | Test | | | |
|---|---|---|---|---|
|  | I | II | III | IV |
|  |  | % by weight | | |
| Polymer dispersion (A) | 85 | 85 | 80 | 85 |
| Polymer dispersion (B) | — | — | 10 | — |
| Polymer dispersion (C) | 10 | 6 | — | 6 |
| Polyoxyethylene glycol 12,000 | — | 4 | 4 | 4 |
| Distearic acid ester of polyoxyethylene glycol (200 ethylene oxide units) | — | — | — | 5 |
| Distearic acid ester of polyoxyalkylene glycol (Molecular weight 3500, 57.5% by weight of propylene oxide and 42.5% by weight of ethyl- | | | | |

TABLE I-continued

|  | I | Test II | III | IV |
|---|---|---|---|---|
|  |  | % by weight |  |  |
| ene oxide) | — | 5 | 6 | — |
| Dibehenic acid ester of polyoxyalkylene glycol (Molecular weight 3500, 57.5% by weight of propylene oxide and 42.5% by weight of ethylene oxide) | 5 | — | — | — |

The dispersion was spread in an 0.35 mm layer on the fabric side of the imitation leather, lined with nettle cloth and subsequently dried for 5 minutes at 120°C.

On the basis of the feel, the imitation leathers obtained in the Tests I, II and III according to the invention were judged particularly soft, but the imitation leather obtained in Test IV was not considered sufficiently soft.

A test of the lined products for welding resistance, water-resistance and artificial aging at elevated temperature brought satisfactory results in all products.

EXAMPLE 4

PVC pastes, that is mixtures of PVC and plasticizers, which are used for coating fabrics, frequently contain dioctyl phthalate as a plasticizer. A disadvantage of the use of dioctyl phthalate and similar plasticizers is that the plasticizer is dissolved when the fabrics are drycleaned, so that the fabric becomes hard and brittle after several drycleanings. A cotton fabric roughed on one side was coated through an air doctor with the use of a PVC paste filled with heavy spar and chalk, as well as an addition of different plasticizers. The coating composition was produced by simply stirring the components in a propeller type stirrer (1000 rpm, 5 minutes). The coated fabric was first pregelled at 120°C and then gelled for 3 minutes at 150°C.

Additional plasticizers were employed with the PVC pastes. These were, on the one hand, dioctylphthalate according to the state of the art, and on the other hand a distearic acid ester of polyoxyalkylene glycol (molecular weight 3500, 57.5% by weight of propylene oxide and 42.5% by weight of ethylene oxide). For colored coatings, which are produced with dyes which are only soluble in PVC plasticizers, e.g. dioctyl phthalate, mixtures of both plasticizers were used. The dyes were first dissolved in dioctyl phthalate. Table II gives the formulation of the pastes.

TABLE II

|  | V | Test VI | VII | VIII |
|---|---|---|---|---|
|  |  | % by weight |  |  |
| PVC paste with fillers | 85 | 79 | 74 | 85 |
| Dioctyl phthalate | 15 | 15 | 15 | — |
| Distearic acid ester of polyoxyalkylene glycol | — | 5 | 10 | 15 |
| Chromophthal-orange 4 R | — | 1 | 1 | — |

The tests showed a substantially softer, smoother feel for the samples VI, VII and VIII than for sample V. In a dry-cleaning test, the samples VI, VII, VIII remained soft and smooth, while sample V became hard and brittle. For the samples VI and VII, a slight decrease of the color intensity was noted.

EXAMPLE 5

By using the plasticizers according to the invention, it is possible to produce imitation leather for boot legs and the like, which show a similar water vapor adsorption as genuine leather. Shoes produced with these imitation leathers wear much better than those produced with conventional imitation leathers, which have a low adsorption of water vapor. The water vapor adsorption was determined on the compositions of Table III.

TABLE III

|  | IX | Test X | XI |
|---|---|---|---|
|  |  | % by Weight |  |
| PVC paste | 84 | 79 | 74 |
| Dioctyl phthalate | 15 | 15 | 15 |
| Distearic acid ester of polyoxyalkylene glycol (as in Example 4) | — | 5 | 10 |
| Chromophthal-orange 4R | 1 | 1 | 1 |

The pastes were applied in a layer thickness of 0.5 mm on reversible paper and gelled for 5 minutes at 170°C. The water vapor adsorption was determined in an atmosphere saturated with water vapor at 38°C according to the method indicated by Seligberger, Jalca, LX, 402–419 (1965). The values reported in Table IV were obtaind.

TABLE IV

| Water vapor adsorption at 38°C | | | | |
|---|---|---|---|---|
|  | Within 1 hour | | Within 6 hours | |
| film | mg $H_2O/cm^2$ | mg $H_2O/cm^3$ | mg $H_2O/cm^2$ | mg $H_2O/cm^3$ |
| IX | 0.15 | 9.7 | 0.25 | 16.5 |
| X | 0.77 | 51.4 | 1.37 | 102.0 |
| XI | 1.01 | 101.0 | 1.93 | 193.0 |

Commercial fatted chrome leather was found to have 90.3 mg water vapor adsorption per $cm^3$ by this method after 6 hours.

EXAMPLE 6

The electric surface resistance of the PVC films produced according to Example 5 was measured with the Teraohmmeter in normal climate with the Siemens electrode (plunger- or strip-electrode with a gap width of 0.8 cm and 3 cm length). In these measurements the room temperature was 20°C and the relative humidity 68 percent.

The following values repoted in Table V were obtained.

TABLE V

|  | Electr. surface resistance in ohm |
|---|---|
| PVC film IX | $3 \times 10^{10}$ |
| PVC film X | $3.5 \times 10^8$ |
| PVC film XI | $1.5 \times 10^8$ |

The addition of 5 to 10 percent of a hydrophilic plasticizer (distearic acid ester of polyoxyalkylene glycol) results in a considerable reduction of the electric surface resistance. The values found are of the order of magnitude of natural cotton.

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. In the process of compounding a plastic dispersion or paste which comprises mixing an ester-type plasticizer which is compatible with an aqueous dispersion of a plastic, with a thermoplastic polymer in the form selected from the group consisting of aqueous dispersions and non-aqueous dispersions and recovering a plastic material, the improvement consisting of using a hydrophilic fatty acid ester of a polyoxyalkylene glycol having the formula

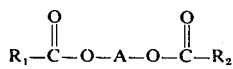

wherein

are the acyls of fatty acids having from 12 to 22 carbon atoms and A is a bivalent polyoxyalkylene having a molecular weight of from 2000 to 4000 and a content of 40 to 50% by weight of ethylene oxide units and 50 to 60% by weight of propylene oxide units, as said ester-type plasticizer.

2. The process of claim 1 wherein said fatty acids having from 12 to 22 carbon atoms are selected from the group consisting of palmitic acid, stearic acid and behenic acid.

3. The process of claim 1 wherein said ester-type plasticizer is employed in an amount of from 2% to 15% by weight, based on the weight of said plastic dispersion or paste.

4. The process of claim 1 wherein said ester-type plasticizer is employed in an amount of from 5 to 10% by weight with said aqueous dispersion of plastic selected from the group consisting of polymers and copolymers of vinyl acetate vinyl chloride, lower alkyl acrylates, lower alkyl methacrylates, butadiene, styrene, di-lower alkyl maleates and ethylene.

5. The process of claim 1 wherein said ester-type plasticizer is employed in an amount of from 5 to 10% by weight of said non-aqueous dispersion of polyvinyl chloride.

6. A dispersion consisting essentially of about 40 to 60% by weight of a thermoplastic polymer and an effective amount of plasticizer in the range of about 2 to 15% by weight of a $C_{12-22}$ fatty acid diester of a polyglycol having a molecular weight of 2,000 to 4,000, said polyglycol being composed of 40 to 50% by weight of ethoxy units and 60 to 50% by weight of propoxy units.

7. An aqueous dispersion according to claim 6.

8. A dispersion according to claim 6 wherein the diester is the diester of a fatty acid from the group consisting of palmitic acid, stearic acid and behenic acid and mixtures thereof with said polyglycol.

9. A composition according to claim 6 wherein the thermoplastic polymer is selected from the group of thermoplastic copolymers of vinyl acetate, vinyl chloride, lower alkyl acrylates, lower alkyl methacrylates, butadiene, styrene, di-lower alkyl maleates, and ethylene.

10. A composition according to claim 6 wherein the thermoplastic polymer is polyvinyl chloride, and the weight of said diester is 5 to 10% of the weight of said dispersion.